Aug. 1, 1961

W. B. SHUCK 2,994,311

FUEL COOLING DEVICE

Filed Jan. 14, 1960

INVENTOR.
William B. Shuck
BY
McGrew and Edwards
ATTORNEYS

United States Patent Office 2,994,311
Patented Aug. 1, 1961

2,994,311
FUEL COOLING DEVICE
William B. Shuck, 1011 Hancock, Laramie, Wyo.
Filed Jan. 14, 1960, Ser. No. 2,463
9 Claims. (Cl. 123—119)

This invention relates to means for cooling the fuel being vaporized from the carburetor of an internal combustion engine so as to maintain the fuel for such an engine substantially below the boiling point of the fuel immediately prior to vaporization.

One of the primary causes of decrease in efficiency of internal combustion engines for vehicles is an excess temperature of the fuel in or adjacent to the carburetor of the engine. Increasing refinement and improvement of fuels has increased the octane rating of the same but has reduced the boiling point of the lower boiling materials in the fuel. This is particularly detrimental for gasoline operated internal combustion engines. When the fuel enters the carburetor at too high a temperature so that the fuel in the carburetor reaches the boiling point, two primary problems are encountered. One is percolation in the carburetor, and the other is boil-over in the carburetor. The percolation and boil-over cause hot stalling and, also, cause pre-ignition or detonation. In warm weather and at higher altitudes the hot stalling and detonation is a serious problem, as the detonation reduces efficiency of the engine and increases the wear and tear on such an engine.

According to the present invention I have provided a cooling system for the fuel of an internal combustion engine so as to provide fuel in the carburetor which is substantially below the boiling point of the fuel. The device not only prevents percolation and carburetor overboil, but also includes the advantages of providing at a particular power setting a more uniform mixture from the carburetor to increase the performance and economy of operation of the engine. The device includes an expansion chamber through which is drawn a small portion of the fuel so that it is vaporized and thereby cooled. This cooled vapor is utilized to reduce the temperature of the fuel in the carburetor. In one form, the cool vapor cools the fuel line and thereby cools the fuel passing through the fuel line immediately before it passes into the carburetor.

Included among the objects and advantages of the present invention is a device for pre-cooling fuel substantially below its boiling point immediately prior to its vaporization from the carburetor. The device maintains a cool fuel in the carburetor to thereby prevent percolation and carburetor overboil and, provides an essentially uniform mixture of air and fuel passing from the carburetor. The device utilizes a small amount of fuel from the main fuel line, vaporizes the same and utilizes the cooling effects of such vaporization to maintain the fuel at a cooled temperature. The suction of the inlet of an internal combustion engine is utilized for the vaporization of the fuel, and fuel vaporized by the cooling device is conveyed into the intake distribution manifold of the engine thereby utilizing all of the fuel passing through the fuel line.

These and other objects and advantages of the invention may be readily ascertained by referring to the following disclosure and appended illustrations in which.

Figure 1:
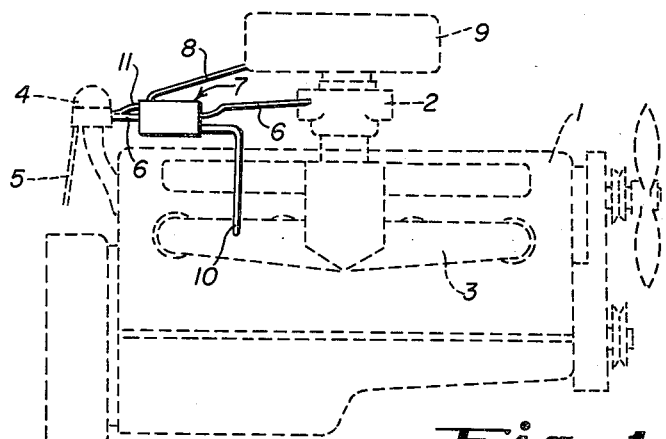
FIG. 1 is a schematic view illustrating the positioning of the fuel cooling device on an internal combustion engine.

In one form of the invention, a cooling device is mounted on the fuel line passing from the engine fuel pump to the carburetor so as to provide a cooled fuel entering the carburetor. In FIG. 1 the general arrangement of such a system is illustrated wherein an engine shown in general by the numeral 1, includes a carburetor 2 for supplying vaporized fuel to a distribution manifold 3. A fuel pump 4 provides fuel from a main fuel line 5 communicating with a fuel tank, not shown, to the engine through a fuel line 6 passing through a cooling device, indicated by numeral 7 into the carburetor 2. An air line 8 from an air cleaner 9 and a suction line 10 from the distribution manifold provide the necessary connections for the cooling device, as will be explained in detail below. A fuel line 11 interconnected with the main fuel line provides a metered quantity of fuel for the device.

Figure 2:
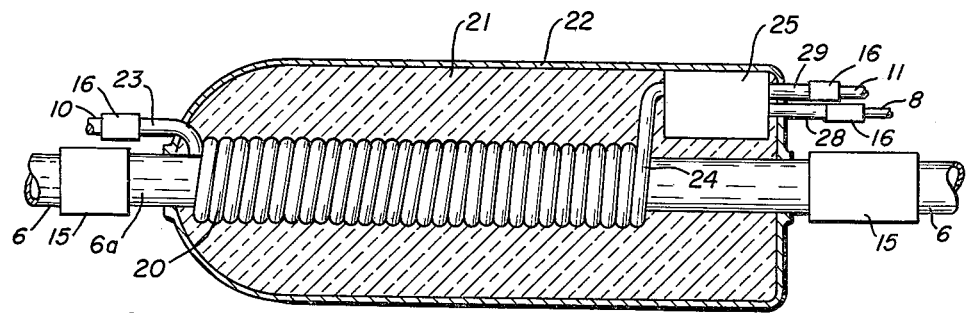
FIG. 2 is a partial cross-sectional elevational view of a device according to the invention installed on a fuel line of an internal combustion engine.
Figure 3:
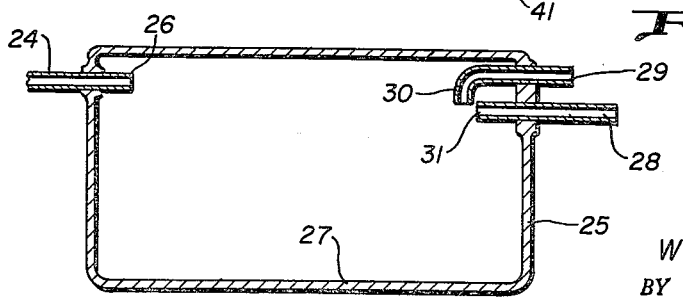
FIG. 3 is an enlarged detail cross-sectional view of an expansion chamber according to the invention.

One form of cooling device is illustrated in FIG. 2 wherein a fuel line 6a has a coil of tubular material 20 tightly coiled along in heat exchange relation. The material of the tubular coils 20 should be of high heat transfer capacity such as aluminum, copper and the like. The coil around the pipe 6a is covered by an insulating material 21 which may be asbestos, glass wool, foamed resins, and the like, sufficient to prevent heating by the engine. An external covering 22 provides a protective shield for the unit. One end 23 of the coils is interconnected with the distribution manifold of the engine, through line 10, FIG. 1, and the opposite end 24 is interconnected with an expansion chamber 25, shown in detail in FIG. 3.

The expansion chamber 25 has the outlet 26 spaced substantially above bottom 27 of the chamber so that raw unvaporized fuel is not withdrawn through the outlet 26. A fuel inlet 29, which is interconnected by a coupling 16 with the fuel line 11 from the pump 4, for example, enters the chamber 25 adjacent to the top thereof through a metering orifice 30. An air inlet 28 which is connected by a coupling 16 to an air supply, as for example line 8 which is connected with the carburetor cleaner, for providing clean air to the expansion chamber, passes through the wall of the expansion chamber and terminates at its inner end 31 adjacent to and directly across the opening 30 of the tube 29.

The device of the invention may be manufactured as a unit, that is, a short piece of fuel line such as 6a is wrapped with a coil of tubular material 20 and the insulation 21 is wrapped around the coil and the attached expansion chamber 25. The protective cover 22 is then placed around the outside with the tubular portion 23 as well as the fuel inlet 29 and air inlet 28 extending outside the cover. The unit is installed on an automobile engine by cutting out a piece of fuel line 6 approximately equal in length to the short piece of tubing 6a. Rubber sleeves, couplings 15, as well as other known connectors are used to connect the device into the gas line replacing the part cut out. The suction line 23 is connected by coupling 16 to line 10 which is then connected to the manifold as by means of the elongated tube 10 threadedly interconnected with a threaded opening which is normally found in automobile engine inlet manifolds. The fuel line 11 is then attached to the main fuel line as by means of a T or the like and then attached to inlet 29 by coupling 16 so that a small amount of fuel may be metered through the orifice into the expansion chamber. Clean air is withdrawn from the carburetor air cleaner 9 by a hole into the interior thereof and fastening the line 8 to the air inlet 28 by coupling 16.

In operation, the vehicle engine is started which starts a flow of fuel through the line 6 and the inserted line 6a, and subsequently through the remainder of line 6 into the carburetor 2. The suction of the inlet manifold reduces the pressure in the coils 20 and the expansion chamber 25, pulling fuel through the lines 11 and 29 to the expansion chamber. Air from the air cleaner is pulled through lines 8 and 28, flowing past the orifice 30 picking up fuel and causing an evaporation and expansion of the fuel. This expansion refrigerates the air which is then pulled through the coils 20 and subsequently through the outlet 23 into the manifold 3 of the engine. The cooled coils keep the fuel line 6a cool and cools the carried fuel.

The flow of fuel passing through a fuel line in a vehicle is at quite a low rate. For example, in an automobile traveling at 60 miles per hour, and if the automobile engine obtains 15 miles per gallon, the rate of flow of gas through the line is only about 0.07 gallon per minute. Passing this quantity through a quarter or 5/16 inch line is at a low velocity so that substantial cooling of the fuel is possible. In certain instances, it may be desirable to have the line 6a larger than a normal gas line 6 so as to still further reduce the velocity flow of fuel through the line during cooling to provide still further cooling. Also in certain instances it may be desirable to provide a thermostat in the fuel line immediately prior to its entrance into the carburetor, with the thermostat interconnected to a connect valve in the inlet line 29. This prevents extreme cooling of the fuel and reduces the possibility of carburetor icing.

It will be noted that by maintaining a fairly uniform temperature of fuel in the carburetor at a temperature substantially below the boiling point of the fuel, very uniform metering of the fuel into the vaporizing section of the carburetor is obtained. The actual efficiency of the engine is thereby increased since a correctly metered amount of fuel enters the cylinders under various power settings at different atmospheric conditions. When the fuel is too hot, a very lean mixture enters the cylinders and detonation results, which not only decreases the efficiency of the engine, but increases engine temperature aggravating the situation by further heating the fuel passing the carburetor.

The device of FIG. 2 illustrates an auxiliary attachment for providing a cooled fuel mixture into the carburetor. It is of course obvious that the coils 20 could be mounted on the carburetor bowl itself or integrally attached to the carburetor so as to maintain the carburetor bowl and its contained fuel at a substantially lowered temperature. Nevertheless, the same principle of operation would apply, since an expansion chamber would be necessary along with a small orifice for bleeding fuel into an expansion chamber and means for introducing clean air into such an expansion chamber for the vaporization and expansion of the fuel. The resultant cooled mixture cools the bowl of the carburetor, maintaining the carburetor bowl and its contained liquid cool.

Figure 4:
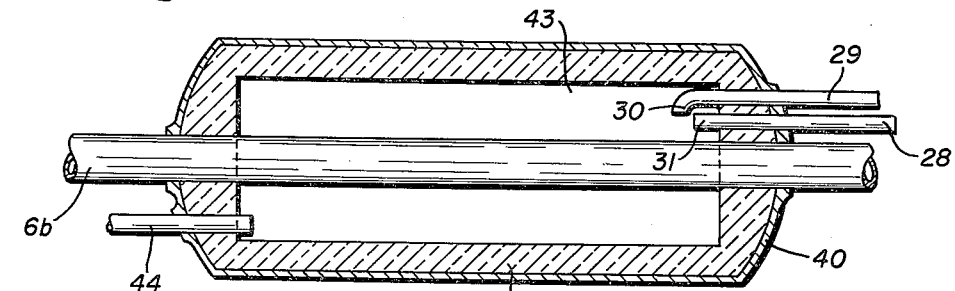
FIG. 4 is a modified cooling device for a fuel line according to the invention.

A modified form of the invention is illustrated in FIG. 4, wherein a fuel line section 6b is provided with an external covering 40 over an insulation layer 41 enclosing an enlarged expansion chamber 43. The expansion chamber is integrally mounted on the exterior of a portion of the pipe 6b. A fuel line inlet 29 arranged for attachment to line 11 provides a metered flow of fuel through orifice 30, and clean air is brought into the expansion chamber 43 through line 28 interconnected with line 8, so that it flows past the metered orifice 30. A suction line 44 in the opposite end of the expansion chamber is interconnected with the line 10 leading to the inlet manifold of the engine. The suction on the chamber vaporizes and expands the fuel. In this instance, the cooled expanded fuel-air mixture is directly in contact with the line 6b, cooling the fuel passing through the line. The connection and operation of the device is essentially the same as that of FIG. 2, except the expanded and cooled mixture passes directly out the outlet 44 into the inlet manifold of the engine.

In an effective unit for passenger automobiles, a 1/8 inch tube coiled along about six inches of the main fuel line was found to sufficiently cool the fuel and increase the power and efficiency of the engine on which it is attached. Generally, the temperature of engine operation determines the amount of diverted fuel for cooling the remainder. In summer, for example, the system can stand substantial cooling since the engine runs hot. In cold weather, less fuel cooling is desired, so a smaller quantity may be diverted for such cooling. The orifice on the unit was about 0.006 square inches while the air inlet orifice was about four times that size. Such a ratio of fuel to air orifice sizes insures complete vaporization in the expansion chamber and provides satisfactory cooling of fuel.

While the device has been illustrated by reference to specifice embodiments, there is no intent to limit the spirit or scope of the invention to precise details so set forth except as defined in the following claims.

I claim:

1. A device for cooling fuel prior to its entry into the vaporizing section of the carburetor of an internal combustion engine which comprises expansion chamber means, means associated with the main fuel line of the engine in heat exchange relation with said expansion chamber means for cooling the fuel passing therethrough, means for by-passing a small quantity of fuel from the main fuel line, means for introducing a metered flow of said by-passed fuel into said expansion chamber, means for passing a flow of air into said expansion chamber and across the outlet of said fuel metering means in said expansion chamber for vaporizing and expanding said fuel, and means for reducing the pressure in said expansion chamber means for drawing air through said air inlet for vaporizing said fuel.

2. A device according to claim 1 in which the means associated with said main fuel line is a tubular coil around a portion of said main fuel line.

3. A device according to claim 1 in which the means for reducing the pressure in said expansion chamber is a conduit interconnecting said expansion chamber with the inlet manifold of the engine.

4. A device according to claim 1 in which the means associated with said main fuel line is a tubular coil around said main fuel line, and said tubular coil being interconnected between said expansion chamber and the inlet manifold of the engine.

5. A device for cooling fuel in an internal combustion engine prior to the fuel entering the vaporizing section of the carburetor thereof comprising means encompassing the main fuel line of said engine in heat exchange relation, an expansion chamber interconnected with said encompassing means arranged for cooling the same, a metered fuel inlet for said expansion chamber, means interconnecting said metered fuel inlet with the main fuel supply of said engine, an air inlet for said expansion chamber having its internal port adjacent to said fuel inlet and arranged to pass a stream of air through fuel entering said chamber, and means interconnected with said encompassing means for reducing the pressure therein and in said expansion chamber for vaporizing fuel entering said expansion chamber means.

6. A device according to claim 5 in which the encompassing means is an enlarged chamber encompassing a portion of the fuel line and integrally communicating with said expansion chamber.

7. A device according to claim 5 in which the encompassing means is a tubular coil encompassing a portion of said main fuel line and interconnected between said expansion chamber and the manifold of said engine.

8. A device for cooling the fuel entering the vaporizing section of a carburetor comprising a coil encompassing a portion of the main fuel line adjacent to the carburetor of the engine and arranged in heat exchange relation therewith, an expansion chamber interconnected with the inlet of said encompassing means, a fuel inlet for said expansion chamber interconnected with the main fuel line of said engine, an orifice arranged in said fuel line for predetermining the flow of fuel therethrough, an air inlet in said expansion chamber arranged to pass a stream of air through the fuel entering said expansion chamber from said orifice, the outlet of said coil around said fuel line being interconnected with the manifold of said engine arranged for drawing air through said coil and said expansion chamber for vaporizing fuel therein, cooling the same and cooling the fuel passing through said main line, and an insulating cover over said coils and said expansion chamber.

9. The method of reducing percolation in the carburetor of an internal combustion engine and increasing operating efficiency thereof comprising passing a metered amount of vaporizable fuel along with air through an enclosed zone for vaporizing and expanding said fuel, drawing vaporized fuel and air from said zone to the inlet manifold of said engine, and passing fuel in the main fuel system of said carburetor through a second zone in heat exchange relation with said enclosed zone for cooling said fuel, and immediately thereafter passing said cooled fuel through the metering section of said carburetor into the vaporizing section thereof.

References Cited in the file of this patent

UNITED STATES PATENTS 2,120,779   Ericson _____ June 14, 1938